Aug. 27, 1957  KARL-ERIK ERIKSSON  2,804,358
DEVICE FOR MOUNTING CATERPILLAR TRACK ROLLERS
Filed May 23, 1955  2 Sheets-Sheet 1

INVENTOR
KARL-ERIK ERIKSSON

Aug. 27, 1957     KARL-ERIK ERIKSSON     2,804,358
DEVICE FOR MOUNTING CATERPILLAR TRACK ROLLERS
Filed May 23, 1955     2 Sheets-Sheet 2

INVENTOR
KARL-ERIK ERIKSSON

United States Patent Office 2,804,358
Patented Aug. 27, 1957

2,804,358

DEVICE FOR MOUNTING CATERPILLAR TRACK ROLLERS

Karl-Erik Eriksson, Stockholm, Sweden

Application May 23, 1955, Serial No. 510,336

3 Claims. (Cl. 308—184)

The invention relates to improvements in a device for mounting caterpillar track rollers on caterpillar tractors, particularly a pair of rollers adapted to support the two edges of the track. Generally, the rollers of such a pair are mounted one on each end of a common sleeve which is, by means of cylinder bearings, journalled on a shaft supported by the frame of the tractor. Of course, the rollers and particularly the bearings are highly exposed to wear especially caused by thrusts when the caterpillar is advanced over stones and the like. Thus, it has been necessary to replace the bearings very often, which has involved heavy expenses as well as plenty of work.

An object of the invention is to provide a resilient mounting, whereby the wear of the rollers and their bearings is reduced.

A further object is to provide an almost leakproof seal for the bearings so as to prevent penetration of dirt and leakage of grease or other lubricants.

According to the invention, one elastic annular member is inserted from each end of the sleeve and tightly fitted in a space between the sleeve and the outer race ring of the cylinder bearing to form a resilient radial support for the latter. The annular members have flanges directed radially inwardly at the ends of the sleeve to enclose the outer ends of the race rings. A collar surrounds the shaft outside each track roller and has an inserted resilient packing ring adapted to slip on to the shaft, said collar being fixed to the outside of the track roller to engage the flange of the annular member and thereby to provide a resilient axial support for adjacent cylinder bearing. Thus, this mounting will be resilient in radial as well as in axial direction, whereby the effect of thrusts is considerably diminished and the wear is reduced.

The invention will be more closely described with reference to the accompanying drawings, in which.

Figure 1:
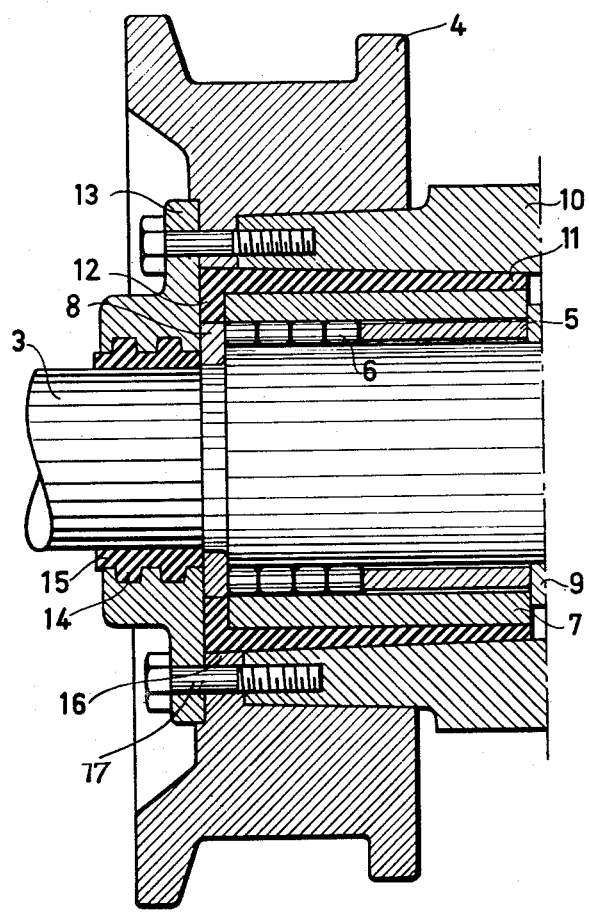
Fig. 1 shows an axial section through a mounted track roller.
Figure 2:
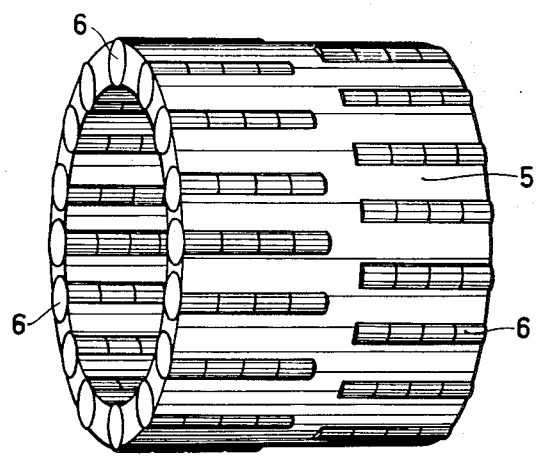
Fig. 2 shows a perspective view of a cylinder bearing preferably used.

In the drawing, 3 designates a shaft adapted to support two track rollers 4 at some distance from each other. The vertical intersection line to the right in Fig. 1 is positioned such that the right portion of the device, not shown, constitutes the exact image of Fig. 1, and thus only half the device will be described in the following. The shaft portion shown in Fig. 1 carries a cylinder bearing. The retainer ring 5 which is shown in Fig. 2 has axial borings extending from both ends and spaced around the periphery. Each boring has a greater diameter than the thickness of the ring 5. A number of bearing cylinders 6 are fitted in each of said borings. The retainer ring is mounted in such a way that the cylinders 6 will engage the shaft 3 directly to roll around it. At its outside the retainer ring 5 is surrounded by a race ring 7 supported by the bearing cylinders 6. A washer 8 rests on a step of the shaft to form an axial support for the cylinders at the end of the retainer ring 5 turned outwardly, and another washer 9 is placed at the inner end of the ring 5 to support the cylinders 6 as well as the race ring 7 axially. The opposite side of the washer 9 forms a support for the outer cylinder bearing, not shown.

The two track rollers 4 are mounted on a common sleeve 10 having a greater inner diameter than the outer diameter of the race ring 7. Externally the sleeve tapers conically towards both its ends to render possible a securing of the track rollers by wedge. Internally, on the other hand, the sleeve is widened conically towards its ends. A collar 11 of rubber or similar elastic material is inserted in the space between the sleeve 10 and the race ring 7. The collar is tapered in correspondence to the inner wall of the sleeve and is tightly fitted to constitute a resilient radial support. The outer end of the rubber collar is provided with a flange 12 directed radially inwards to form a support for the outer end of the race ring 7.

Outside the track roller 4 the shaft 3 is surrounded by a collar 13 the inside of which has two peripheral grooves for receiving corresponding ribs 14 of an inserted packing ring 15 of rubber or similar elastic material. The ring 15 is arranged to engage the shaft tightly and to slip onto it. The collar 13 is provided with a number of axially directed holes evenly spaced along its periphery, and corresponding holes are provided in an inwardly directed flange 16 of the track roller 4 and in the end of the sleeve 10 turned towards this flange. Preferably, only the holes in the sleeve 10 are threaded. Bolts 17 inserted through these corresponding holes are tightened to press the collar 13 against the roller 4 and the flange 12 of the rubber collar 11.

Evidently, a certain resilient mounting of the track rollers is obtained by the arrangement described, in that the elastic rings 11 and 15 soften bumps and jolts in radial direction. Of course, this resilient action is not great but in practice it has proved sufficient to reduce the effect of even heavy shocks to such an extent that the life of the bearing is considerably increased. A contributive cause to the reduced wear is the tightness of the device, whereby impurities are prevented from penetrating into the bearings. It is true that a hub cap, not shown, is generally provided outside the collar, but nevertheless impurities may gradually penetrate between the shaft and the surrounding packing ring 15. However, the flange 12 of the elastic ring 11 forms, together with the washer 8, an effective barrier against further penetration, so that the bearing is well protected. As an example it may be mentioned that, while it was previously necessary to replace the whole bearing every year, it will now be sufficient to replace the packing 15 of the collar 13 once a year, when using the device according to the invention. Investigations have shown that the bearing will last for three or at least for two years. As a caterpillar tractor has a great number of track rollers, this improvement involves a considerable reduction of the expenses for maintenance and repairs.

What I claim is:

1. A device for mounting a pair of caterpillar track rollers adapted to support the two edges of the tracks of a tractor, comprising in combination a shaft mounted in the frame of the tractor, a sleeve carrying one of the rollers at each end and journalled on the shaft by means of cylinder bearings one inside each end of the sleeve, each of said cylinder bearings consisting of a cylinder retainer mounted directly on the shaft and a surrounding race ring, an elastic annular member inserted from each end of the sleeve and tightly fitted in a space between the sleeve and the outer periphery of the race ring of its associated cylinder bearing to form a resilient radial support therefor, said annular member having a flange directed radially inwardly at the end of the sleeve to enclose the outer end of said race ring, and a collar surrounding the shaft outside each track roller and having an inserted resilient packing ring adapted to slip onto the shaft, said collar being fixed to the outside of the track roller to engage the flange of the annular elastic member and thereby to provide a resilient axial support for the adjacent cylinder bearing.

2. A device for mounting a pair of caterpillar track rollers adapted to support the two edges of the tracks of a tractor, comprising in combination a shaft mounted in the frame of the tractor, a sleeve carrying one of the rollers at each end and journalled on the shaft by means of cylinder bearings one inside each end of the sleeve, each of said cylinder bearings consisting of a cylinder retainer mounted directly on the shaft and a surrounding race ring, an elastic annular member inserted from each end of the sleeve and tightly fitted in a space between the sleeve and the outer periphery of the race ring of its associated cylinder bearing to form a resilient radial support therefor, said annular member having a flange directed radially inwardly at the end of the sleeve to enclose the outer end of said race ring, washer means forming an axial support for the cylinder retainers of the bearings and engaging the inner periphery of the flange to provide a substantially leakproof seal and a collar surrounding the shaft outside each track roller and having an inserted resilient packing ring adapted to slip onto the shaft, said collar being fixed to the outside of the track roller to engage a flange of the annular elastic member and thereby to provide a resilient axial support for adjacent cylinder bearing.

3. A device in accordance with claim 2, wherein additional washer means is mounted between the cylinder retainers of the cylinder bearings to provide an axial support for the cylinder bearings and the race rings thereof.

References Cited in the file of this patent
UNITED STATES PATENTS

| | | |
|---|---|---|
| 1,691,805 | Haulton | Nov. 13, 1928 |
| 1,982,729 | Eberhard | Dec. 4, 1934 |
| 2,481,812 | Beatrice | Sept. 13, 1949 |